(12) United States Patent
Ishikake

(10) Patent No.: US 10,133,898 B2
(45) Date of Patent: Nov. 20, 2018

(54) PROTECTION BARRIER AND LASER IRRADIATION SYSTEM

(71) Applicant: Satoru Ishikake, Kanagawa (JP)

(72) Inventor: Satoru Ishikake, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/558,349

(22) PCT Filed: Mar. 11, 2016

(86) PCT No.: PCT/JP2016/001387
§ 371 (c)(1),
(2) Date: Sep. 14, 2017

(87) PCT Pub. No.: WO2016/147632
PCT Pub. Date: Sep. 22, 2016

(65) Prior Publication Data
US 2018/0068142 A1    Mar. 8, 2018

(30) Foreign Application Priority Data

Mar. 18, 2015   (JP) ................................ 2015-054675

(51) Int. Cl.
*G06K 19/06*   (2006.01)
*G06K 7/10*   (2006.01)
(Continued)

(52) U.S. Cl.
CPC ............ *G06K 7/10792* (2013.01); *B07C 3/18* (2013.01); *G06K 7/01* (2013.01); *G02F 2001/1536* (2013.01)

(58) Field of Classification Search
USPC .................................................. 235/487–494
See application file for complete search history.

(56) References Cited

U.S. PATENT DOCUMENTS 3,643,216 A * 2/1972 Greenaway ............ G03H 1/041
                                                235/457
3,666,946 A * 5/1972 Trimble .................... F21K 2/00
                                                235/468
(Continued)

FOREIGN PATENT DOCUMENTS

DE    10 2009 017 837 A1    10/2010
JP    2009-183959    8/2009
(Continued)

OTHER PUBLICATIONS

International Search Report dated Jun. 7, 2016 for counterpart International Patent Application No. PCT/JP2016/001387 filed Mar. 11, 2016.

(Continued)

*Primary Examiner* — Jamara Franklin
(74) *Attorney, Agent, or Firm* — Oblon, McClelland, Maier & Neustadt, L.L.P.

(57) ABSTRACT

A protection barrier including openings through which an irradiation target passes through the protection barrier, wherein the protection barrier is configured to surround a light path of laser light emitted from a laser device towards a recording medium disposed on the irradiation target, and surround the irradiation target, and wherein a light intensity of laser light leaked from the openings is 390 μW or less.

8 Claims, 13 Drawing Sheets

(51) Int. Cl.
  *G06K 7/01* (2006.01)
  *B07C 3/18* (2006.01)
  *G02F 1/153* (2006.01)

(56) References Cited

U.S. PATENT DOCUMENTS

| | | | |
|---|---|---|---|
| 8,284,222 | B2 | 10/2012 | Ishimi et al. |
| 8,358,325 | B2 | 1/2013 | Asai et al. |
| 8,471,885 | B2 | 6/2013 | Ishimi et al. |
| 8,598,074 | B2 | 12/2013 | Kawahara et al. |
| 8,633,958 | B2 | 1/2014 | Kawahara et al. |
| 8,643,689 | B2 | 2/2014 | Ishimi et al. |
| 8,665,496 | B2 | 3/2014 | Hasegawa et al. |
| 8,933,981 | B2 | 1/2015 | Yamamoto et al. |
| 9,090,105 | B2 | 7/2015 | Ishikake et al. |
| 2007/0023406 | A1 | 2/2007 | Heberer |
| 2012/0075402 | A1 | 3/2012 | Ishimi et al. |
| 2012/0211673 | A1 | 8/2012 | Yamamoto |
| 2013/0135425 | A1 | 5/2013 | Yamamoto |
| 2013/0141512 | A1 | 6/2013 | Asai et al. |
| 2013/0182060 | A1 | 7/2013 | Furukawa et al. |
| 2014/0078234 | A1 | 3/2014 | Kawahara et al. |
| 2014/0099574 | A1 | 4/2014 | Kawahara et al. |
| 2014/0158771 | A1 | 6/2014 | Ohi et al. |
| 2014/0285606 | A1 | 9/2014 | Ishimi et al. |
| 2015/0080214 | A1 | 3/2015 | Yamamoto et al. |
| 2015/0151550 | A1 | 6/2015 | Asai et al. |

FOREIGN PATENT DOCUMENTS

| | | |
|---|---|---|
| JP | 2009-183962 A | 8/2009 |
| JP | 2013-158790 | 8/2013 |
| WO | WO 2004/108343 A1 | 12/2004 |
| WO | WO 2010/121748 A1 | 10/2010 |

OTHER PUBLICATIONS

Written Opinion of the International Searching Authority dated Jun. 7, 2016 for counterpart International Patent Application No. PCT/JP2016/001387 filed Mar. 11, 2016.

Extended European Search Report dated Mar. 14, 2018 in Patent Application No. 16764464.0.

* cited by examiner

[Fig. 1]
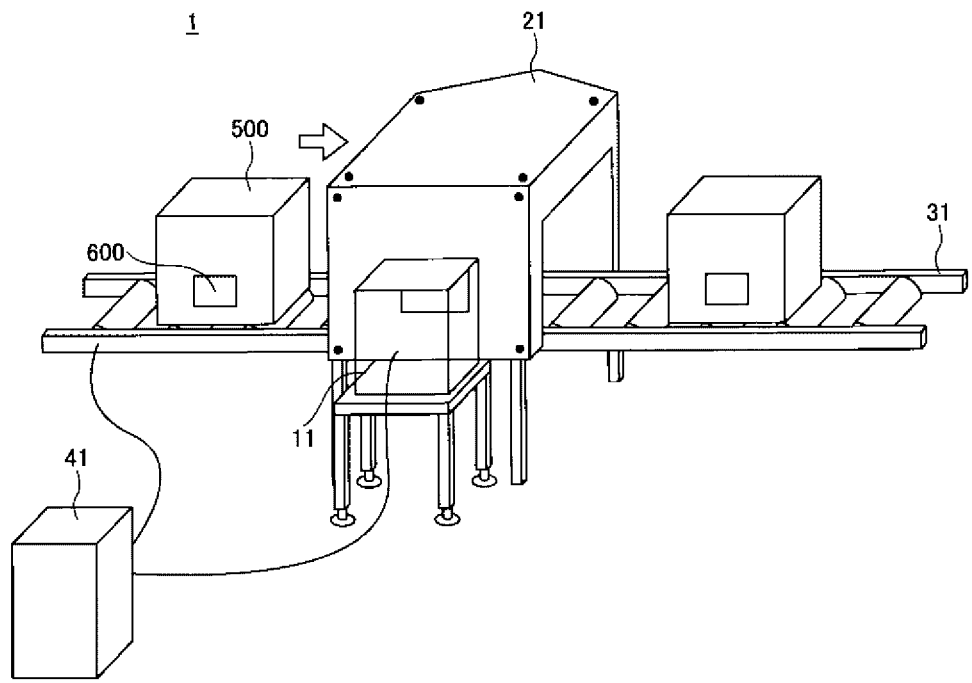
[Fig. 2]
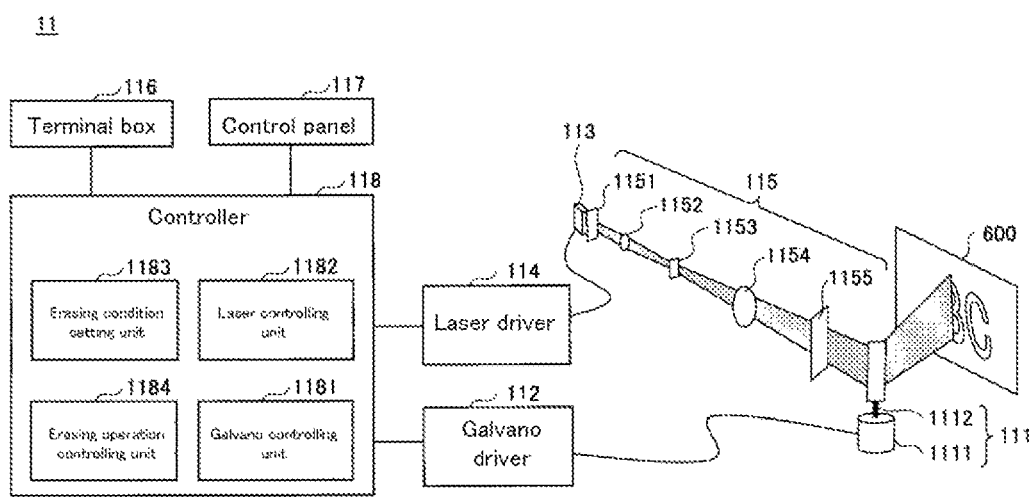

[Fig. 3]
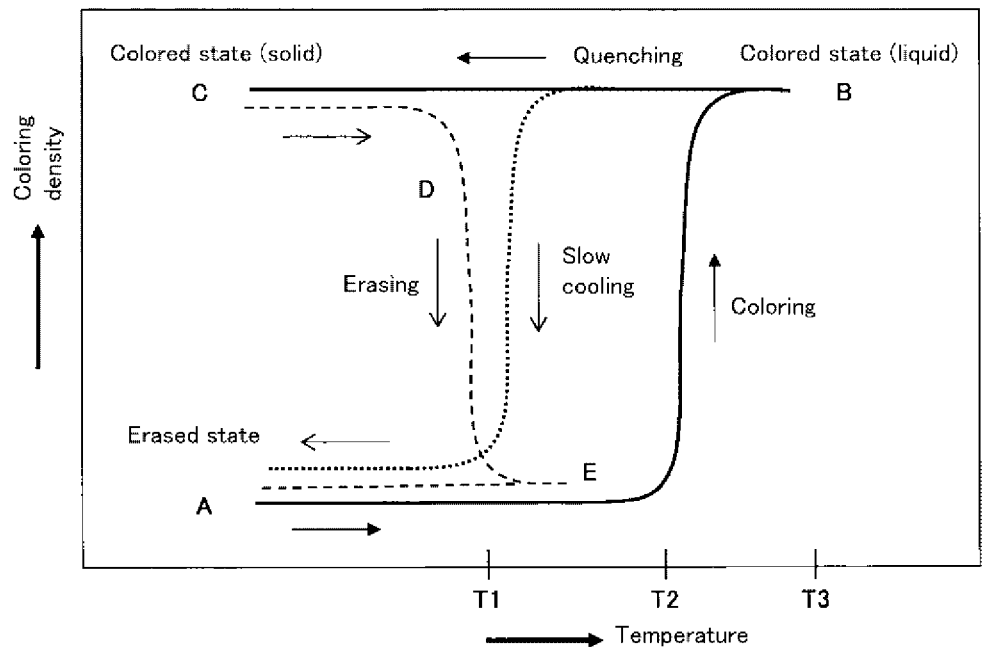
[Fig. 4]
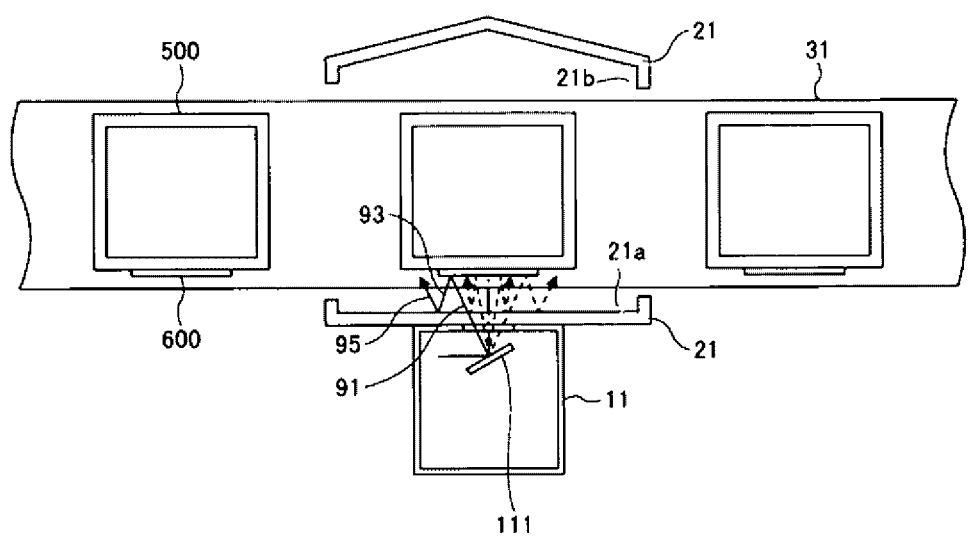

[Fig. 5A]
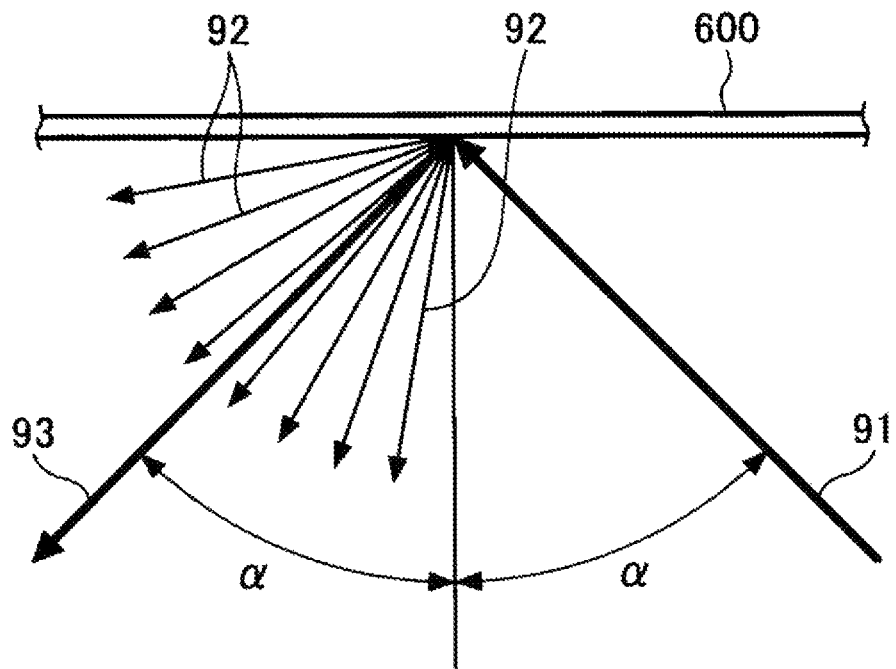
[Fig. 5B]
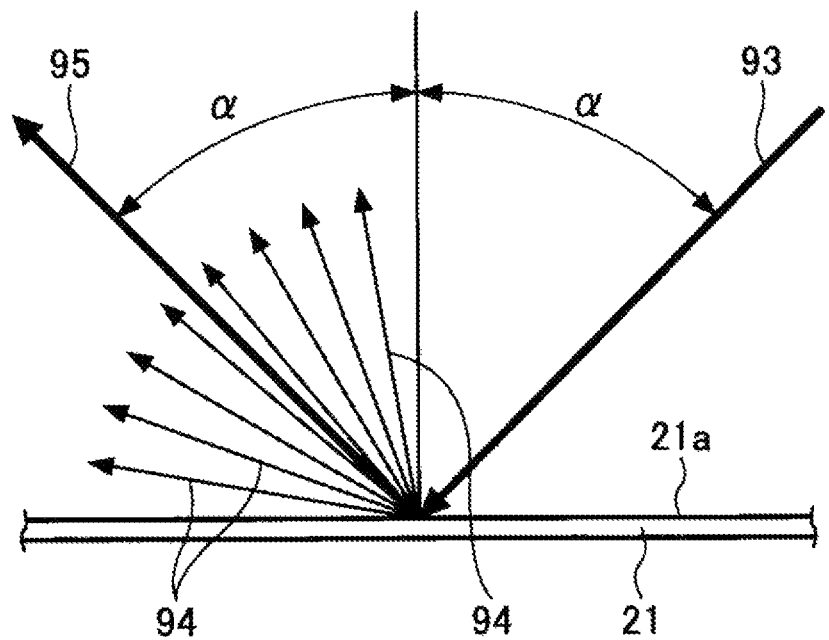

[Fig. 6]
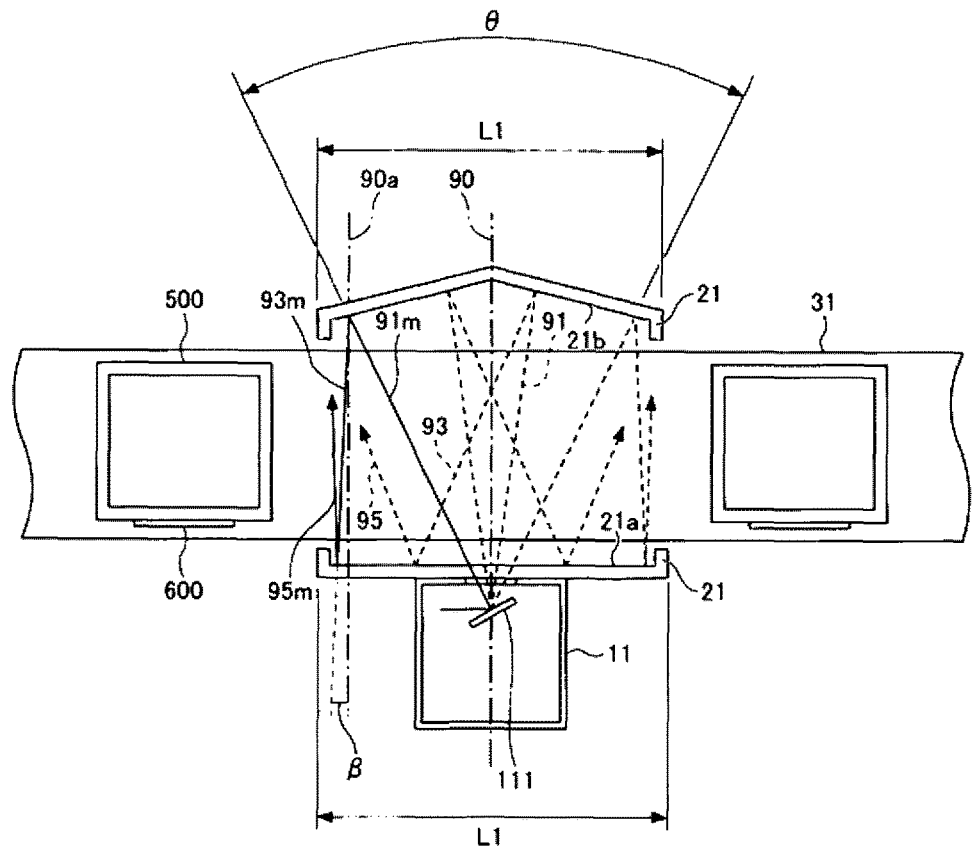
[Fig. 7]
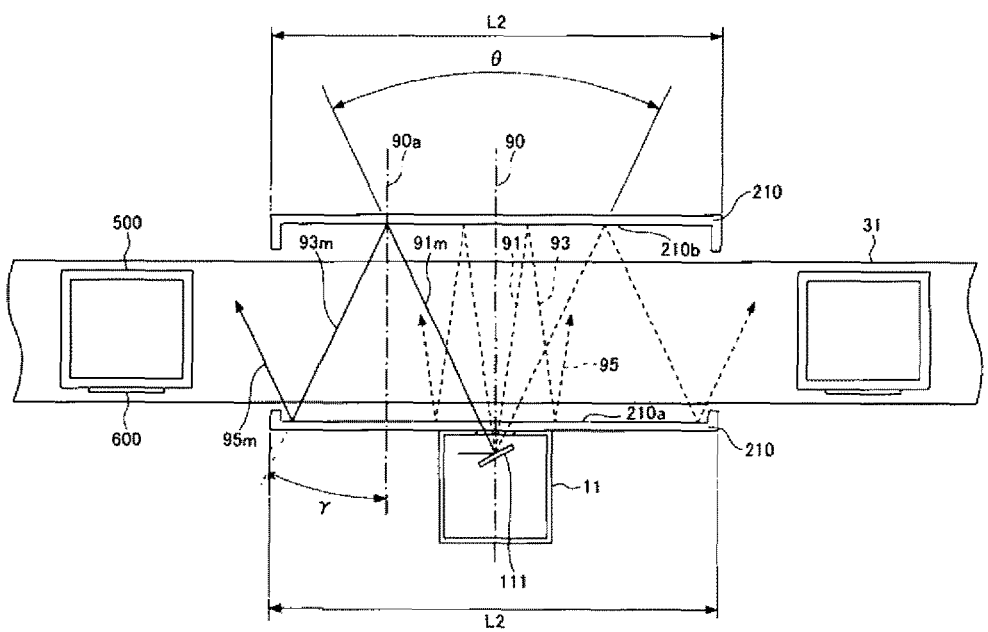

[Fig. 8]
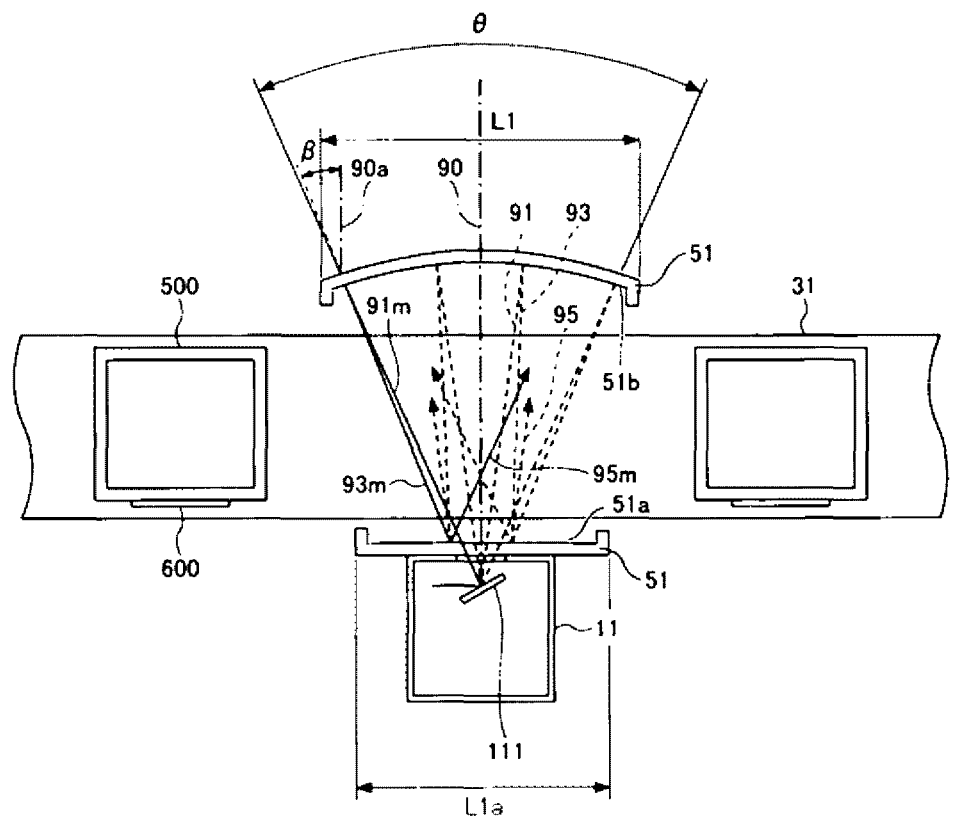
[Fig. 9]
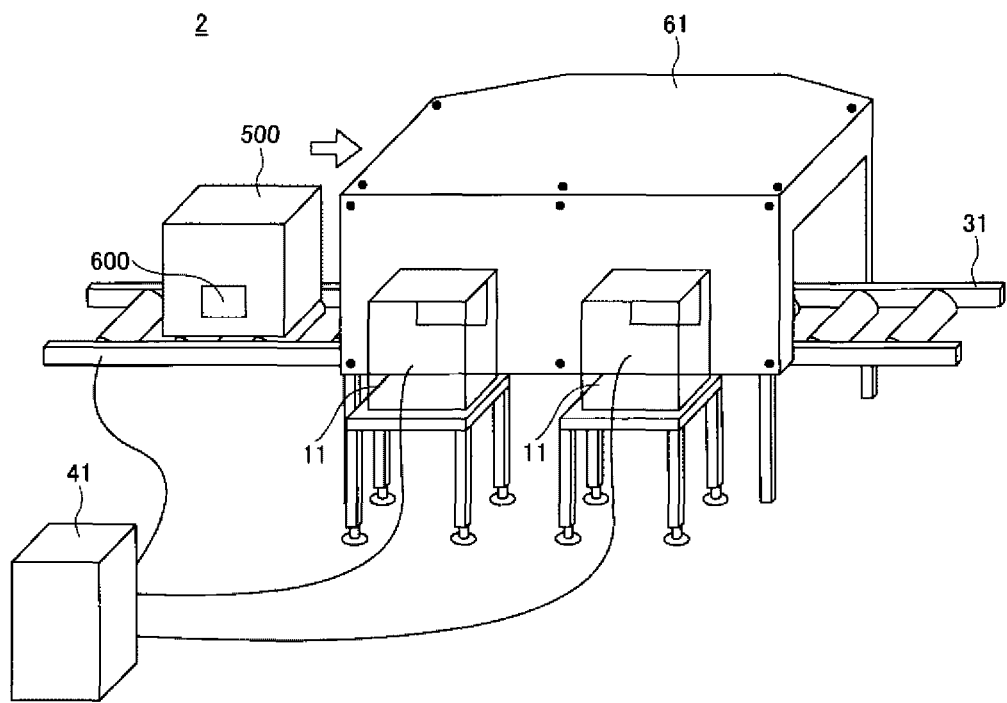

[Fig. 10]
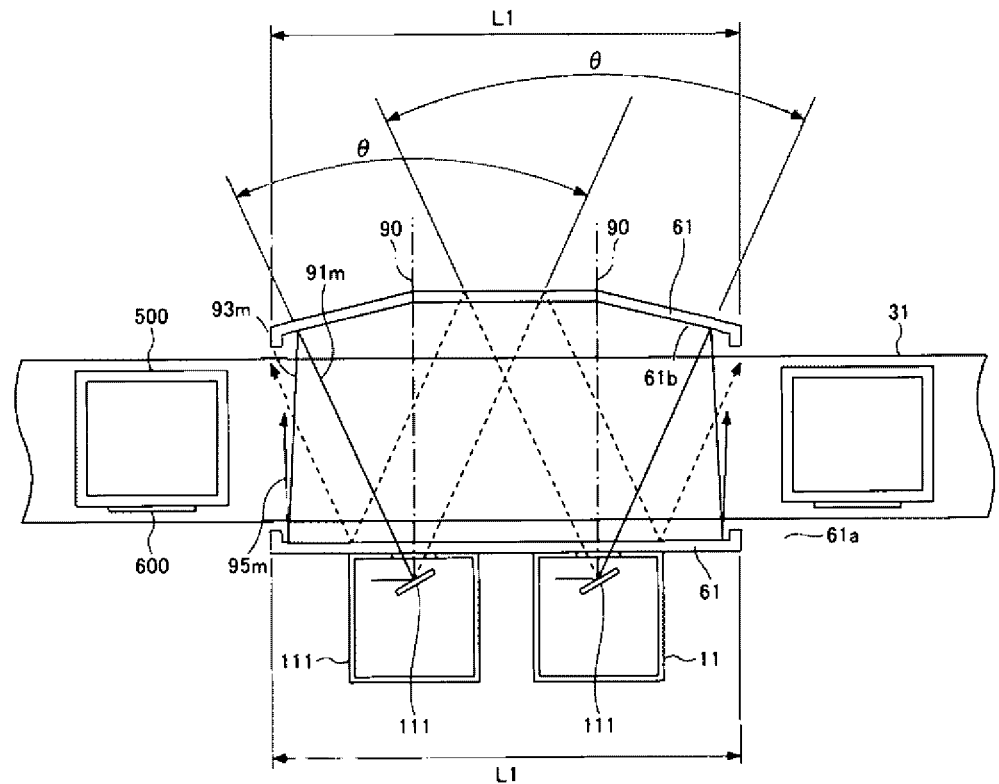
[Fig. 11]
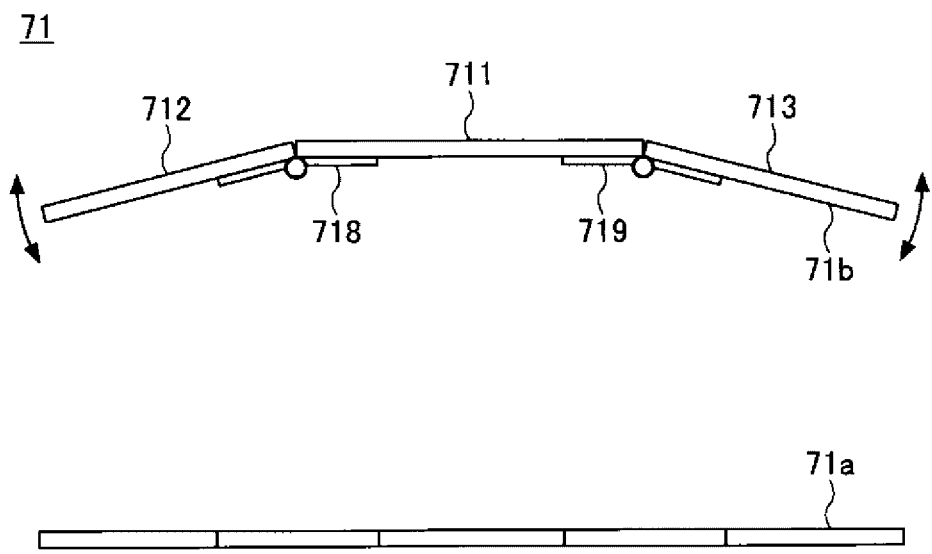

[Fig. 12]
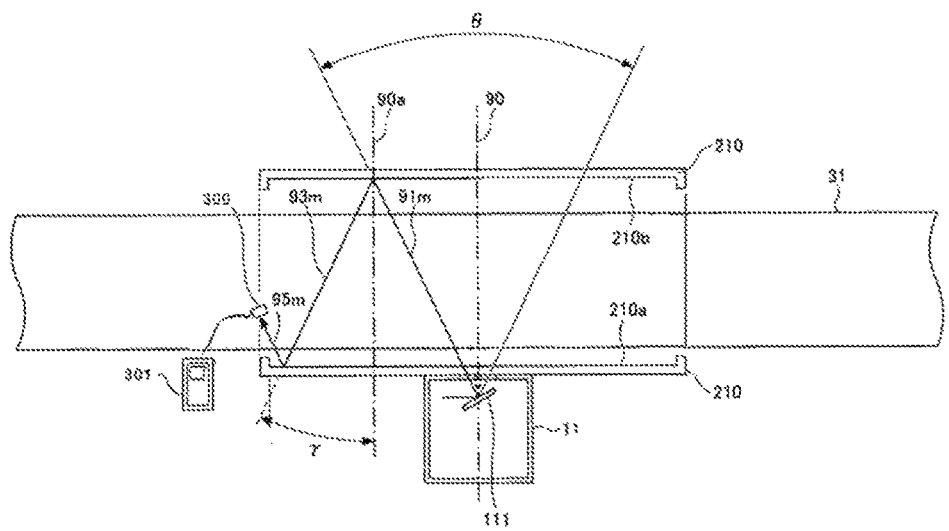
[Fig. 13]
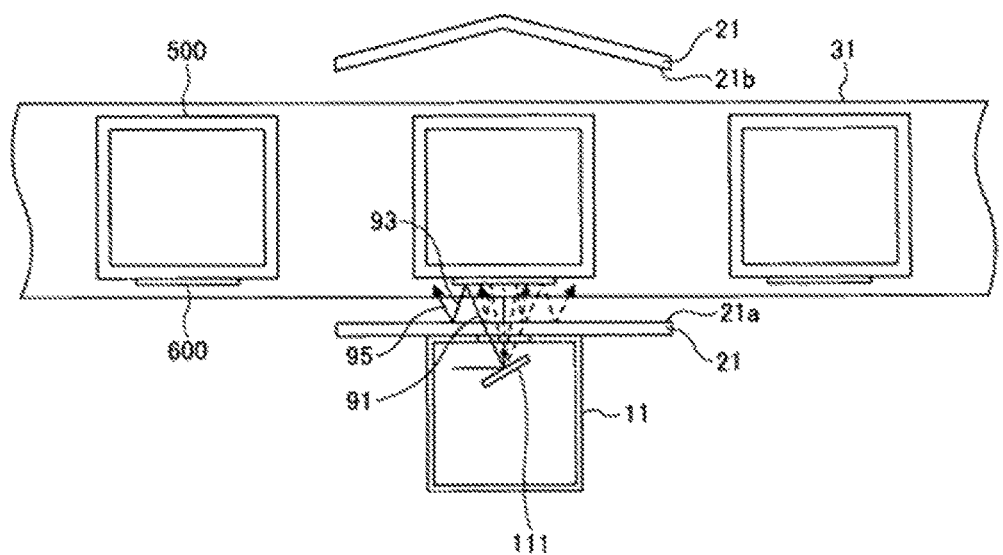

[Fig. 14A]
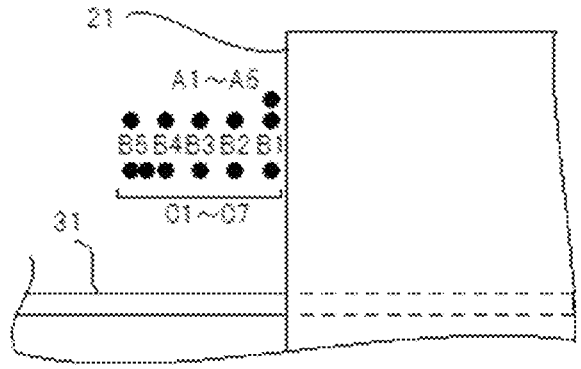
[Fig. 14B]
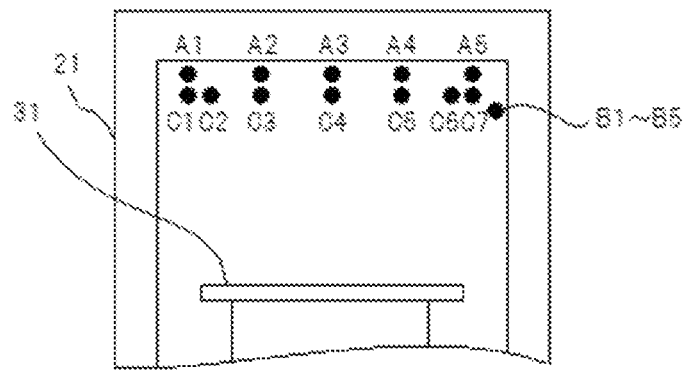
[Fig. 14C]
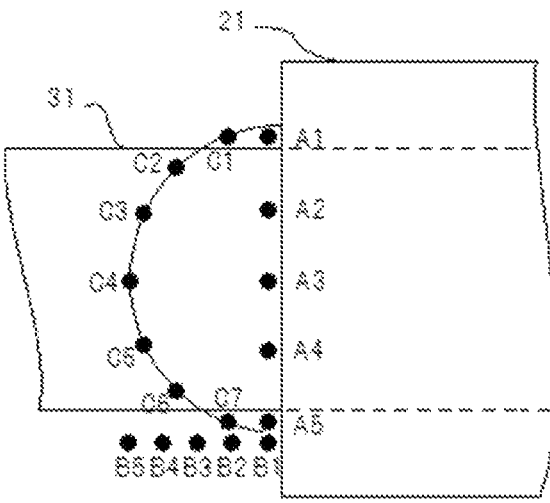

[Fig. 15]
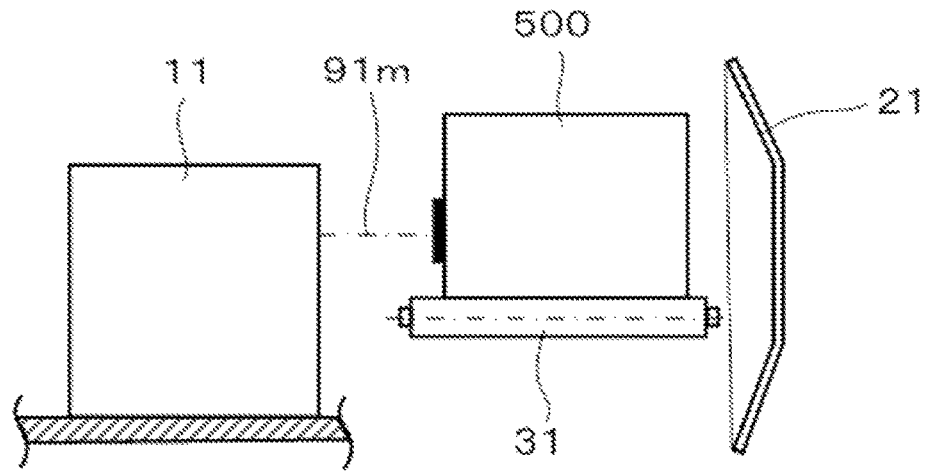
[Fig. 16]
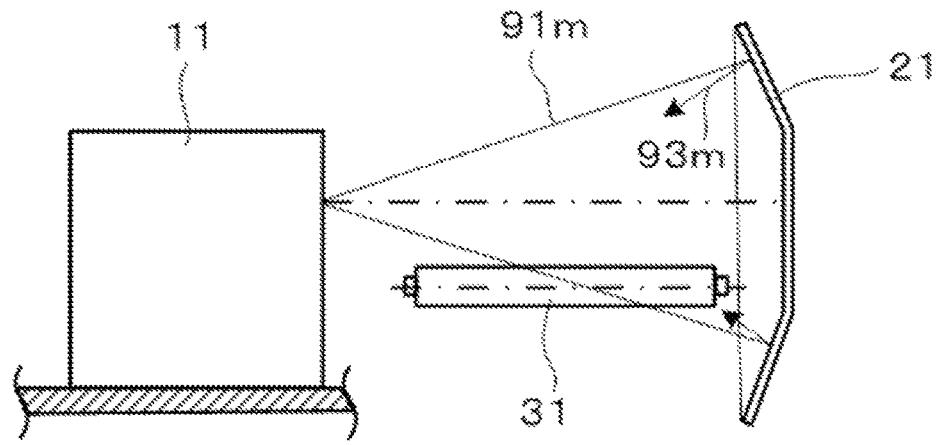
[Fig. 17A]
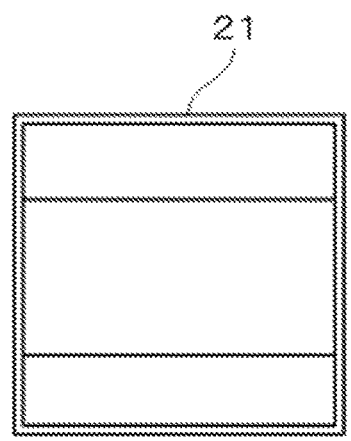

[Fig. 17B]
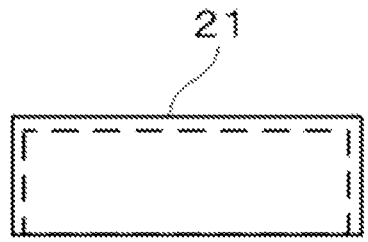
[Fig. 17C]
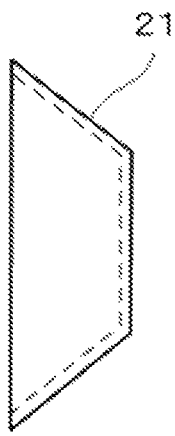
[Fig. 18]
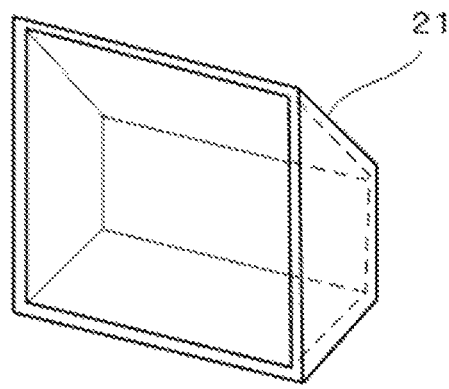

[Fig. 19A]
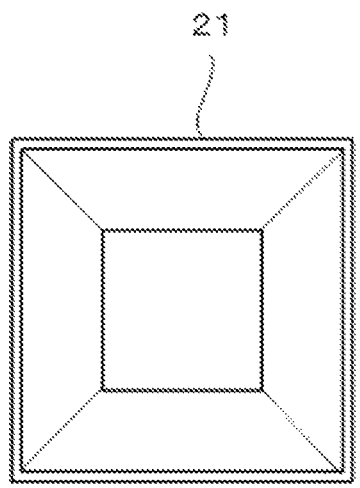
[Fig. 19B]
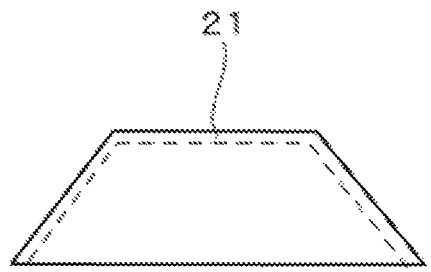
[Fig. 19C]
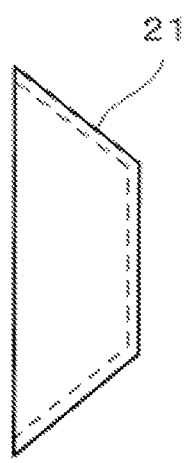

[Fig. 20]
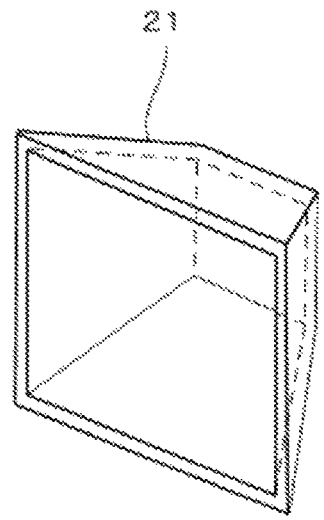
[Fig. 21A]
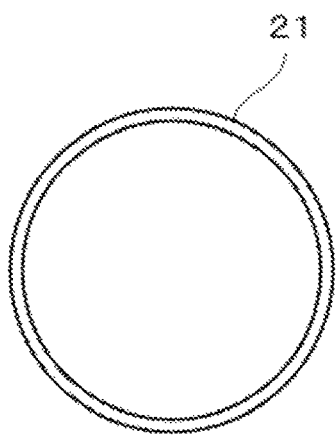
[Fig. 21B]
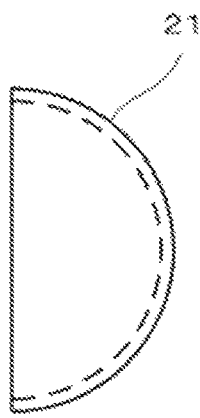

[Fig. 21C]
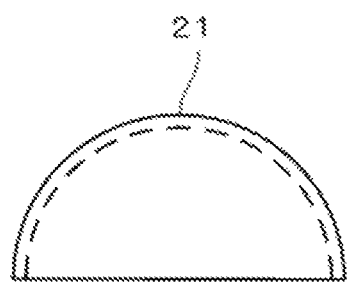
[Fig. 22]
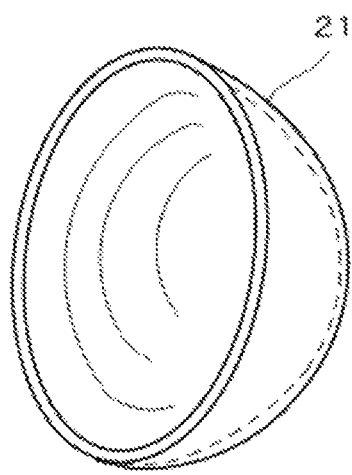

PROTECTION BARRIER AND LASER IRRADIATION SYSTEM

TECHNICAL FIELD

The present disclosure relates to protection barriers and laser irradiation systems.

BACKGROUND ART

In a distribution conveyor system, conventionally, an object to be transported (a baggage, or a container) can be identified by attaching, by means of an auto labeler, an adhesive label, to which necessary information, such as shipping address, and barcode, is printed, to the object transported by a conveyor.

Recently, a reversible thermosensitive recording medium, which colors and erases with heat, has been applied as a label for a transporting container for a distribution conveyor system, in view of energy saving, and protection of the environment. Systems for printing an object to be transported (an irradiation target) in a non-contact manner using a laser device have been proposed (see, for example, PTL 1).

Laser light used for label printing in such a system is extremely strong, and may burn or damage eye sight, if the laser light is directly applied to skin or eyes of humans. Accordingly, a protection barrier is installed in a working environment where people may come close to a laser device during printing, in order to adjust the laser exposure to human bodies to a safe level.

As for the protection barrier, a member having a relatively large surface roughness, which is typically prepared by applying surface coating onto a metal plate, is typically used in order to facilitate laser light applied to be absorbed, or diffuse reflected. Laser light emitted from a laser device needs to be reflected at least twice or more, to reduce the intensity of regular reflection light of laser light to a safe level to human bodies. Specifically, it is necessary that the protection barrier has a structure with which primary reflection light is not released to the outside.

However, a reflection direction of primary reflection light generated by reflecting laser light emitted from a laser device on an inner surface of a conventional protection barrier is not considered, when an object to be transported is not present. Accordingly, there is a problem that a scale of a protection barrier is increased, of the protection barrier has a structure with which primary reflection light is not released to the outside.

CITATION LIST

Patent Literature

PTL 1: Japanese Unexamined Patent Application Publication No. 2009-183959

SUMMARY OF INVENTION

Technical Problem

The present invention aims to provide a protection barrier, which has a structure that prevents primary reflection light from being released outside, and is smaller than a conventional protection barrier.

Solution to Problem

As the means for solving the aforementioned problems, the protection barrier of the present invention include openings through which an irradiation target passes through the protection barrier. The protection barrier is configured to surround a light path of laser light emitted from a laser device towards a recording medium disposed on the irradiation target, and surround the irradiation target. Moreover, a light intensity of laser light leaked from the openings is 390 µW or less.

Advantageous Effects of Invention

The present invention can provide a protection barrier, which has a structure that prevents primary reflection light from being released outside, and is smaller than a conventional protection barrier.

BRIEF DESCRIPTION OF DRAWINGS

FIG. 1 is a perspective view for illustrating one example of the laser irradiation system according to the first embodiment.

FIG. 2 is a view for illustrating one example of a structure of the laser device.

FIG. 3 is a diagram for demonstrating a colored state and erased state of a rewritable label.

FIG. 4 is a view for illustrating one example of the protection barrier according to the first embodiment (regular operation).

FIG. 5A is a view for illustrating primary reflection light.

FIG. 5B is a view for illustrating secondary reflection light.

FIG. 6 is a view for illustrating one example of the protection barrier according to the first embodiment (abnormal operation).

FIG. 7 is a view for illustrating a protection barrier according to Comparative Example.

FIG. 8 is a view for illustrating one example of the protection barrier according to the second embodiment.

FIG. 9 is a perspective view illustrating one example of the laser irradiation system according to the third embodiment.

FIG. 10 is a view for illustrating one example of the protection barrier according to the third embodiment.

FIG. 11 is a view for illustrating one example of the protection barrier according to the fourth embodiment.

FIG. 12 is a view for illustrating one example where the power sensor is arranged adjacent to an area at the outer side of the opening of the protection barrier.

FIG. 13 is a view for illustrating one example where the both edges of the first inner surface of the protection barrier relative to the transporting direction are not curved into the side of the conveyor, in a planar view thereof.

FIG. 14A is a front view illustrating each of the measuring positions A1 to A5, the measuring positions B1 to B5, and the measuring positions C1 to C7.

FIG. 14B is a left-side view illustrating each of the measuring positions A1 to A5, the measuring positions B1 to B5, and the measuring positions C1 to C7.

FIG. 14C is a plan view illustrating each of the measuring positions A1 to A5, the measuring positions B1 to B5, and the measuring positions C1 to C7.

FIG. 15 is a side view illustrating one example where a container is present on a conveyor, according to the fifth embodiment.

FIG. 16 is a side view illustrating one example where a container is not present on a conveyor, according to the fifth embodiment.

FIG. 17A is a front view illustrating the protection barrier of the fifth embodiment.

FIG. 17B is a top view illustrating the protection barrier of the fifth embodiment.

FIG. 17C is a right-side view illustrating the protection barrier of the fifth embodiment.

FIG. 18 is a perspective view illustrating the protection barrier of the fifth embodiment.

FIG. 19A is a front view illustrating the protection barrier of the sixth embodiment.

FIG. 19B is a top view illustrating the protection barrier of the sixth embodiment.

FIG. 19C is a right-side view illustrating the protection barrier of the sixth embodiment.

FIG. 20 is a perspective view illustrating the protection barrier of the sixth embodiment.

FIG. 21A is a front view illustrating the protection barrier of the seventh embodiment.

FIG. 21B is a top view illustrating the protection barrier of the seventh embodiment.

FIG. 21C is a right-side view illustrating the protection barrier of the seventh embodiment.

FIG. 22 is a perspective view illustrating the protection barrier of the seventh embodiment.

DESCRIPTION OF EMBODIMENTS

Embodiments for carrying out the present invention are described with reference to the drawings, hereinafter. In each drawing, an identical reference is given to an identical constitutional component, and a description may be omitted when overlapped.

The term "irradiation target" means an object to which laser light is applied. Examples of the irradiation target include a plastic container, a cardboard box, a paper box, a wooden box, and a metal pallet.

The term "irradiation target" also includes a processing target. Examples of the processing target include "an object, which is partially melted as laser transmitted from a laser oscillator using a reflection mirror is condensed with a condensing lens, and applied, and is cut by blowing assist gas (auxiliary gas) from a nozzle to the area where laser is applied, to blow off the melted product," and "an object, to which characters or symbols are engraved by applying laser to modify part of a surface thereof, or to melt or evaporate part of the surface."

The term "recording medium" means a medium that can absorb laser to form an image, and means a sheet to which a rewritable material is applied, or an area of an irradiation target, to which a rewritable material is applied. In the case where a material constituting an irradiation target itself can absorb light to form an image, moreover, the irradiation target can be regarded as a recording medium.

First Embodiment

—Entire Structure of Laser Irradiation System—

FIG. 1 is a perspective view illustrating the laser irradiation system according to the first embodiment. Referring to FIG. 1, the laser irradiation system 1 includes a laser device 11, a protection barrier 21, a conveyor 31, and a controlling device 41.

For example, the laser device 11 is a marker configured to print on a label, or an eraser configured to erase the print on the label. In the present embodiment, a case where the laser device 11 is an eraser is described hereinafter.

In the laser irradiation system 1, the conveyor 31 (roller conveyor), which is a transporting device, is controlled by the controlling device 41. The control sections of the conveyor 31 are separated into a section that is the upstream of the laser device 11 (upstream of the conveying direction), and a section that is in front of the laser device 11 (in front of the emission direction).

For example, the controlling device 41 judges a presence of the container 500, which is an irradiation target (control target) by a sensor, to control the conveyor 31 to move or stop in each section. Use of the conveyor controlling device 41 can convey the container 500 without bumping into the container 500 in front of the line, or can stop the container 500 in from of the laser device 11.

A rewritable label 600, which is a recording medium, is attached to a side surface of the container 500. The rewritable label 600 is a label, on which a visual image can be repeatedly printed or erased with heat generated when laser light is absorbed. The content or delivery destination of the container 500 can be printed on the rewritable label 600. For example, the rewritable label 600 is a reversible thermosensitive recording medium.

The laser device 11 is arranged with the predetermined positional relationship with the conveyor 31, and is an eraser configured to apply laser light to the rewritable label 600 to erase the information printed on the rewritable label 600 in a non-contact manner.

The laser device 11 is connected to the controlling device 41. The controlling device 41 can control to output an erasing onset signal when the container 500 is stopped in from of the laser device 11. Erasing may be performed with transporting the container 500, depending on the transportation accuracy of the conveyor 31, or a type of an image or characters to be printed.

The protection barrier 21, which is a laser safety cover, is disposed in front of the laser device 11. The protection barrier 21 is configured to surround a light path of laser light scanned at a deflection angle θ towards the rewritable label 600 from the laser device 11, and surround the irradiation target 500.

—Structural Example and Basic Action of Laser Device 11 (Eraser)—

FIG. 2 is a view illustrating an example of the structure of the laser device. With reference to FIG. 2, the laser device 11 serving as the eraser includes, for example, a galvanometer mirror 111, a galvano driver 112, a laser diode array 113, a laser driver 114, a plurality of lenses 115, a terminal block 116, a control panel 117, and a controller 118.

The galvanometer mirror 111 is a galvanometer 1111 equipped with a mirror 1112 for reflecting laser light, and is configured to deflection scan laser light.

The galvano driver 112 is a driving circuit configured to control an angle of the galvanometer mirror 111 according to the indicated value from the galvano controlling unit 1181 of the controller 118. The galvano driver 112 compares an angle sensor signal of the galvanometer mirror 111 with the indicated value from the galvano controlling unit 1181 of the controller 118, and transmits a driving signal to the galvanometer mirror 111 to minimize the difference with the angle sensor signal and the indicated value. The galvano controlling unit 1181 is capable of generating and outputting an analog signal for moving the galvanometer mirror 111 from the scanning starting position to the scanning end position instructed by the erasing operation controlling unit 1184 at the designated speed.

The laser diode array 113 is a module having a plurality of laser light sources. For example, the laser diode array 113 is equipped with about 10 to about 20 laser light sources. The length of a plurality of the light sources is about 10 mm. The laser driver 114 is a circuit for generating driving current of the laser diode array 113, and is capable of controlling a laser power of the laser diode array 113 according to the instructed value from the laser controlling unit 1182 of the controller 118.

As for a laser light source of the laser device, a semiconductor laser using a semiconductor as a medium, a solid laser using a slid as a medium (e.g., a YAG laser), or a gas laser using a gas as a medium [e.g., a $CO_2$ laser (a carbon dioxide laser)] is used.

The laser controlling unit 1182 converts the laser output value instructed by the erasing operation controlling unit 1184 into the analog voltage, and output the analog voltage to the laser driver 114. Moreover, the laser controlling unit 1182 can generate a timing signal for turning on or turning off the laser diode array 113.

Laser light emitted from the laser diode array 113 is expanded by a plurality of lenses 115, as well as homogenizing the energy density of laser light, to thereby form, for example, a linear beam having a length of 60 mm, and a width of 0.5 mm is formed on a surface of the rewritable label 600. Note that, the power of laser light emitted from the laser device 11 is larger than the power of laser light emitted from the marker.

For example, the aforementioned lenses 115 have a structure where a cylindrical lens 1151, spherical lens 1152, a microlens array 1153, a spherical lens 1154, and a cylindrical lens 1155 are arranged in this order from the side of the laser diode array 113.

To the terminal block 116, terminals of input signals (e.g., an erasing onset signal, an interlock signal, an environmental temperature signal, and an encoder signal), and terminals of output signals (e.g., an erasing-preparation completion signal, an erasing signal, and an abnormality occurrence signal) are disposed.

The erasing onset signal is a signal for making the laser device 11 start an erasing operation. The interlock signal is a signal for emergency stopping the erasing operation. The environmental temperature signal is a signal for collecting the laser power according to the environmental temperature. The encoder signal is a signal for detecting the traveling speed of the irradiation target. The erasing-preparation completion signal is a signal for indicating that it is ready for receiving the erasing onset signal. Furthermore, the erasing signal is a signal for indicating that erasing is in progress. The abnormality occurrence signal is a signal for indicating that the controller 118 has detected abnormalities, such as an abnormality of the laser diode array 113, and an abnormality of the galvanometer mirror 111.

For example, the control panel 117 can be composed in a manner that a menu is selected or numbers can be input from a user interface having a display and switches. The erasing condition setting unit 1183 of the controller 118 controls the control panel 117, and can set erasing conditions (e.g., a scanning length of laser light, a scanning speed of laser light, a scanning direction of laser light, an output power of laser light, a delay of erasing start, and a speed of an irradiation target) designated by the user on the laser device 11.

The erasing operation controlling unit 1184 of the controller 118 processes the input signal of the terminal block 116 to instruct the galvano controlling unit 1181 or the laser controlling unit 1182, as well as generating an output signal of the terminal block 116.

—Coloring and Erasing of Rewritable Label—

In the rewritable label 600, for example, low-molecular organic materials before melting are a leuco dye and a reversible color developer (may be referred to as a "color developer" hereinafter), and the low-molecular organic materials after melting but before crystalizing are the leuco dye and the color developer. The color tone of the rewritable label 600 reversibly changes between a transparent state and a colored state upon application of heat.

FIG. 3 is a diagram for describing a colored state and erased state of the rewritable label. With reference to FIG. 3, first, a recording layer in the erased state (A) is heated, and the leuco dye and the color developer are melted and mixed at the melting temperature T2 to color. As a result, the recording layer is turned into the colored state (B). The colored state (B) is a liquid.

As the recording layer in the colored state (B) is quenched, the recording layer can be cooled to room temperature with remaining the colored state, and the recording layer is turned into the colored state (C), in which the colored state is stabilized, and solidified. Whether the colored state (C) is formed depends on a cooling speed from the melted state. When the recording layer in the melted state is slowly cooled, the color is erased in the process of cooling, and the recording layer is turned back to the erased state (A) identical to the initial state, or a state where the color density is relatively low compared to the colored state (C) achieved by quenching.

As the recording layer in the colored state (C) is again heated, the color is erased at the temperature T1 lower than the coloring temperature (from D to E). As the recording layer in this state is cooled, the recording layer is turned into the erased state (A) identical to the initial state.

The colored state (C) attained by quenching from the melted state is a state where the leuco dye and the color developer are mixed to a degree that molecules thereof can carry out a catalytic reaction, and often forms a solid state. In this state, it is assumed that the melted mixture (colored mixture) of the leuco dye and the color developer are crystalized to retain the color, and the formation of this structure stabilizes the color.

In the erased state, on the other hand, the leuco dye and the color developer are present in a state of a phase separation. In this state, it is assumed that molecules of at least one of the compounds are aggregated to form a domain, or crystallized, and the leuco dye and the color developer are separated and stabilized as a result of the aggregation or crystallization. In many cases, more complete erasing is achieved, when the leuco dye and the color developer form a phase separation, and the color developer is crystallized.

Note that, the recording layer may cause an erasing failure, even when the recording layer is heated to the erasing temperature, if the recording layer is repeatedly heated to the temperature T3 that is equal to or higher than the melting temperature T2. It is assumed that this is because the color developer is thermally decomposed, and the color developer is not easily aggregated or crystallized, and it is difficult to separate the color developer from the leuco dye. When the rewritable label 600 is heated, a deterioration of the rewritable label 600 due to repeated recording and erasing can be suppressed by reducing a difference between the melting temperature T2 and the temperature T3.

Moreover, the laser device for use in the present invention is not limited to a laser device, which realizes a coloring state and erased state of the aforementioned rewritable label repeatedly. The protection barrier can be also used as a laser protection barrier for a laser device, which colors a label only once. The protection barrier can be also used as a laser protection barrier, which covers a laser processing machine that applies laser light to an irradiation target to perform machining, cutting, curving, or marking.

—Protection Barrier—

The protection barrier according to the present embodiment is specifically described hereinafter. FIG. 4 is a view for describing the protection barrier according to the first embodiment.

As for the protection barrier, members constituting the protection barrier are arranged at the horizontal plane 21A, a plane 21B that is parallel to and perpendicular to the conveying direction of the conveyor 31, and a plane that is vertical to and perpendicular to the conveying direction of the conveyor 31. The protection barrier is disposed in a manner that laser light emitted from the laser device or reflection light is not leaked outside the protection barrier. Among the aforementioned members, an opening is formed at least in a region corresponding to the cross-section of the transporting direction of the container 500 on the member arranged at the plane that is vertical to and perpendicular to the transporting direction of the conveyor 31.

Since a mechanism for opening or closing an opening-closing member synchronized with the timing when the container 500 passes may cause an operation failure, or may cause an inconvenient situation that the member is worn to come to the end of service life, and parts replacement may be required. Accordingly, the opening-closing member, such as a shutter, is not disposed.

Light released from the opening of the protection barrier to the outside as reflection light of laser emitted from the laser device 11, such as primary reflection light, and secondary reflection light, may be described as leaked light hereinafter.

The light intensity of laser light leaked from the opening is, for example, Class 1 or less, as determined by IEC60825-1, and JIS C 6802. Specifically, the light intensity is preferably 1,390 µW or less, when the wavelength of laser light is 976 nm.

When the wavelength of laser light is in the range of from 500 nm through 700 nm, moreover, the light intensity is preferably 390 µW or less. When the wavelength is in the range of from 700 nm through 1,400 nm, the light intensity is preferably a value calculated by the following formula.

$$390 \times 10^{0.002(\lambda-700)} (\mu W)$$

$\lambda$: wavelength

In the case where the wavelength is 976 nm, for example, the calculated value is $390 \times 10^{0.0552} = 390 \times 3.565$, which is nearly equal to 1,390 (µW). Therefore, the light intensity is preferably 1,390 µW or less.

The light intensity of the leaked light is measured by applying the leaked light onto a receiving surface of a power sensor 300, and reading displayed information on a display 301 connected to the 300.

An arrangement example of the power sensor 300 relative to the laser device 11 and the protection barrier 210 is illustrated in FIG. 12 (a plan view of the conveyor system), and the procedure of the measurement is described below.

As illustrated in FIG. 12, the power sensor 300 (photodiode sensor, product number: PD300-TP, manufactured by Ophir Optronics Solutions Ltd.) is arranged adjacent to the outer side of the outlet of the protection barrier 210, and adjusted to make an angle of the light receiving surface of the power sensor 300 with secondary reflection light 95m a right angle. The height of the light receiving surface of the power sensor 300 is adjusted to be the same as the height of a center of laser emitted from the laser device 11.

Moreover, the power sensor 300 is connected to a display 301 (product name: Vega, manufactured by Ophir Optronics Solutions Ltd.) via a cable, to display the intensity of laser applied on the light receiving surface of the power sensor 300 on the display 301.

Laser is emitted from the laser device 11 in the state where an irradiation target is not disposed on the conveyor 31, and the laser device 11 set to emit laser 91m with a maximum deflection angle θ. The intensity of leaked light can be measured by reading the maximum value displayed on the display 301, while laser is emitted from the laser device 11.

Moreover, the intensity of leaked light may be measured by a method where power sensors 300 are disposed at each of the positions A1 through A5, B1 through B5, and C1 through C7, as illustrated in FIGS. 14A to 14C, and the maximum value of the measured values is determined as a value of leaked light. Each of the positions A1 through A5 is set for the purpose of detecting the maximum value in the direction vertical to the travelling direction of the conveyor. Each of the positions B1 through B5 is set for the purpose of detecting the maximum value of laser as applied depending on the difference in the position of an operator standing adjacent to the conveyor. Each of the positions C1 through C7 is assumed the position where hands of an operator standing adjacent to the conveyor may come across, and is set for the purpose of detecting the maximum value of laser applied depending on the different position.

FIG. 4 is a view for illustrating a state where the laser irradiation system 1 is regularly operated. FIGS. 5A and 5B are each a view for illustrating reflection light. The term "regular" means a state where laser light is emitted from a laser radiation outlet of the laser device 11, when the laser radiation outlet of the laser device 11 is opposed to the container 500.

Specifically, in the regular state, the container 500 is temporarily stopped at the position opposed to the laser radiation outlet of the laser device 11, as illustrated in FIG. 4, and laser light 91 emitted from the laser device 11 is applied to the rewritable label 600. The surface (second inner side surface 21b) of the protection barrier 21 opposed to a laser radiation aperture of the laser device 11 is curved to project towards an outer side of the protection barrier 21.

As illustrated in FIGS. 4 and 5A, laser light 91 applied onto the rewritable label 600 is mainly absorbed by a coloring layer containing a photothermal conversion agent as a main component. Part of laser reflected without being absorbed becomes diffuse reflection light 92, and the rest of reflected laser becomes primary reflection light 93. Primary reflection light 93 is regular reflection light whose incident angle and reflection angle are both α.

The diffuse reflection light 92 is laser light the intensity of which is weakened by dispersing directions to be reflected, and is Class 1 or less as defined by IEC60825-1 and JIS C 6802 (the aforementioned Class 1 may be merely referred to as "Class 1" hereinafter). However, the intensity of primary reflection light 93 may be greater than Class 1.

As illustrated in FIG. 4 and FIG. 5B, primary reflection light 93 is applied onto the first inner surface 21a of the protection barrier 21. Part of the primary reflection light 93 applied to the first inner surface 21a of the protection barrier 21 becomes diffuse reflection light 94, and the rest becomes secondary reflection light 95. Secondary reflection light 95 is regular reflection light whose incident angle and reflection angle are both α.

As diffuse reflection light 94 is diffused in many directions, the light intensity thereof is Class 1 or less. The intensity of secondary reflection light 95 is also Class 1 or less, as it has been reflected several times. Accordingly, exposure of laser light to human bodies is minimum, and safe, even when secondary reflection light 95 is released from the openings of the protection barrier 21 to the outside.

FIG. 6 is a view for illustrating the protection barrier according to the first embodiment, and illustrates a state where the laser irradiation system 1 is not operated regularly (abnormal operation). FIG. 6 is a plan view in which the laser irradiation system 1 is viewed from the normal direction of the conveyor 31. Viewing a target from this direction may be referred as "in a planar view thereof."

When an abnormality is generated, such as in the controlling device 41, for example, the container 500 may not be present at the position at which laser light 91 emitted from the laser device 11 is scanned onto the rewritable label 600, as illustrated in FIG. 6. As laser light 91 is emitted from the laser device 11, in this case, laser light 91 passes a space where the container 500 originally needs to be temporarily stopped, and is applied onto the second inner surface 21b of the protection barrier 21. Note that, the second inner surface 21b is a surface facing the first inner surface 21a via the region where the irradiation target 500 is transported.

Part of laser light 91 applied onto the second inner surface 21b of the protection barrier 21 is absorbed by the protection barrier 21, and the rest is reflected. Similarly to the case of FIG. 5A, part of laser light 91 is then regularly reflected by the second inner surface 21b of the protection barrier 21 to become primary reflection light 93, and the rest is diffuse reflected to become diffuse reflection light 92.

Similarly to the case of FIG. 4, the intensity of diffuse reflection light 92 is weakened by dispersing directions to be reflected, and is Class 1 or less. However, the intensity of primary reflection light 93 may be still greater than Class 1. As primary reflection light 93 is released from the openings of the protection barrier 21 to the outside, therefore, people present in the surrounding area may be exposed, which needs to be prevented.

As one example, a case where a power of laser light 91 emitted from the laser device 11 is 70 W, a wavelength thereof is 976 nm, a power of the primary reflection light 93 just after reflection is 260 mW, and a power of secondary reflection light 95 just after reflection is 1,000 nW is considered. In this case, the intensity of primary reflection light 93 is greater than the maximum value (1,390 nW) of Class 1 applied to the predetermined wavelength, but the intensity of secondary reflection light 95 is equal to or less than the maximum value (1,390 nW) of Class 1.

In order to prevent primary reflection light 93 from being released from the openings of the protection barrier 21, therefore, the protection barrier 21 is also disposed on a light path of primary reflection light 93, but a size of the protection barrier 21 can be made small in the present embodiment, compared to conventional protection barriers. The small-size protection barrier 21 of the present embodiment is described hereinafter.

In FIG. 6, $\theta$ is a deflection angle of laser light 91 emitted from the galvanometer mirror 111 of the laser device 11, and 90 is a center line of the deflection angle $\theta$. Moreover, 90a is a line parallel to the center line 90. Furthermore, 91m is laser light applied at the maximum deflection angle, and 93m is primary reflection light when laser light 91m is reflected by the second inner surface 21b of the protection barrier 21.

Moreover, 95m is secondary reflection light, when primary reflection light 93m is reflected by the first inner surface 21a of the protection barrier 21.

The protection barrier 21 is designed in a manner that "as the shape of the second inner surface 21b, an angle $\beta$ between primary reflection light 93m and a line 90a is smaller than $\theta/2$, in a planar view thereof, and primary reflection light 93 of whole laser light 91 within the deflection angle $\theta$ including laser light 91m is applied onto the first inner surface 21a of the protection barrier 21" (the descriptions within the brackets " " may be referred to as the predetermined conditions, hereinafter).

Specifically, whole primary reflection light 93 is always applied onto the first inner surface 21a of the protection barrier 21, and is not directly released from the openings of the protection barrier 21 to the outside. Diffuse reflection light 92 and 94, or secondary reflection light 95 becomes laser light the intensity of which is Class 1 or less, and thus is safe even when such laser light is released from the openings of the protection barrier 21 to the outside.

In the case of FIG. 6, the second inner surface 21b of the protection barrier 21, to which laser light 91 is applied from the laser device 11, is composed of a planar member, and the protection barrier 21 has an advantage that the protection barrier is easily produced.

The unique effects exhibited by the protection barrier 21 according to the present embodiment are described with reference to Comparative Example. FIG. 7 is a view for illustrating the protection barrier according to Comparative Example. As illustrated in FIG. 7, in the protection barrier 210 according to Comparative Example, the second inner surface 210b is a single plane parallel to the first inner surface 210a, and an angle $\gamma$ formed between primary reflection light 93m and the line 90a parallel to the center line 90 is $\gamma=\theta/2$, in a planar view thereof.

Specifically, the angle $\gamma$ is always larger than the angle $\beta$, that is the angle $\gamma$ (Comparative Example)>the angle $\beta$ (the present embodiment). Therefore, the width L2 of the protection barrier 210 is greater than the width L1 of the protection barrier 21 (see FIG. 6). In other words, in the protection barrier 21 according to the present embodiment, the second inner surface 21b is not a single plane parallel to the first inner surface 21a, but has the predetermined shape with which the angle $\beta$ formed between primary reflection light 93m and the line 90a parallel to the center line 90 is smaller than $\theta/2$. As a result, the width L1 of the protection barrier 21 can be made smaller than the width L2 of the protection barrier 210 according to Comparative Example. Specifically, the protection barrier 21 can be made smaller than the protection barrier 210.

As the protection barrier 21 is made smaller, an installation area thereof is smaller than an installation area of a conventional protection barrier. Therefore, there is hardly any restriction in an installation location, and the number of steps required for an installation operation can be reduced.

In the example of FIG. 6, an angle formed between primary reflection light 93 of whole laser light 91 applied to the second inner surface 21b within the deflection angle $\theta$, and the line 90a parallel to the center line 90 of the deflection angle $\theta$, in a planar view thereof, is smaller than $\theta/2$, when the container 500 is not present at the position where laser light is scanned. However, it is not necessary to design to meet the aforementioned angle, as long as the protection barrier satisfies the aforementioned predetermined conditions.

In other words, in a planar view thereof, the second inner surface 21b may have, for example, a shape where the area of the second inner surface 21b adjacent to the center line 90 is made parallel to the first inner surface 21a, and both edge areas of the second inner surface 21b may be inclined in the same manner as in FIG. 6, different from the shape illustrated in FIG. 6. In this case, the protection barrier having the same width L1 to that of FIG. 6 can be also realized by appropriately designing the protection barrier.

Second Embodiment

The second embodiment is an example where a protection barrier having a different shape to that of the protection barrier of the first embodiment. Note that, in the second embodiment, descriptions of the identical components or constitutional units to the first embodiment may be omitted.

FIG. 8 is a view for describing the protection barrier according to the second embodiment, and illustrates a state where the laser irradiation system 1 is not regularly operated.

The shape of the second inner surface 51b of the protection barrier 51 is appropriately designed to satisfy the aforementioned predetermined conditions. Specifically, the shape of the second inner surface 51b of the protection barrier 51 is designed in a manner that an angle β formed between primary reflection light 93m and the line 90a in a planar view thereof is smaller than θ/2, and primary reflection light 93 of whole laser light 91 within the deflection angle θ including laser light 91m is applied onto the first inner surface 51a of the protection barrier 51.

Specifically, whole primary reflection light 93 is always applied onto the first inner surface 51a of the protection barrier 51, and is not directly released from the openings of the protection barrier 51 to the outside. Since diffuse reflection light 92 or 94, or the secondary reflection light 95 becomes laser light the intensity of which is Class 1 or less, such laser light is safe to human bodies, even if laser light is released outside from the opening of the protection barrier 51.

The aforementioned points are the same in the first embodiment. The protection barrier 51 according to the second embodiment is different from the protection barrier of the first embodiment in that the second inner surface 51b is an arc-shaped curved surface with the galvanometer mirror 111 present as an approximately center.

Whole laser light 91 applied onto the second inner surface 51b, which is an arc-shaped curved surface with the galvanometer mirror 111 present as an approximately center, within the deflection angle θ including laser light 91m has an incident angle and reflection angle of approximately zero relative to the second inner surface 51b. Accordingly, primary reflection light 93 of laser light 91 emitted from the laser device 11 is applied to the area of the first inner surface 51a of the protection barrier 51 adjacent to the laser radiation aperture. Accordingly, the first inner surface 51a of the protection barrier 51 can absorb and reflect primary reflection light, even when the length L1a of the first inner surface 51a of the protection barrier 51 of FIG. 8 and the length L1 has a relationship of L1a<L1. Therefore, the length of the area of the first inner surface 51a of the protection barrier 51 where primary reflection light 93 is applied can be made shorter compared to the case of FIG. 6. The following behaviors are the same as in the case of FIG. 6.

In the example of FIG. 8, an angle formed between primary reflection light 93 of whole laser light 91 applied on the second inner surface 51b within the deflection angle θ, and the line 90a parallel to the center line 90 of the deflection angle θ, in a planar view thereof, is smaller than θ/2, when the container 500 is not present at the position where laser light is scanned. However, it is not necessary to design to meet the aforementioned angle, as long as the protection barrier satisfies the aforementioned predetermined conditions.

In other words, in a planar view thereof, the second inner surface 51b may have, for example, a shape where the area of the second inner surface 51b adjacent to the center line 90 is made parallel to the first inner surface 51a, and both edge areas of the second inner surface 51b may be curved in the same manner as in FIG. 8, different from the shape illustrated in FIG. 8. In this case, the protection barrier having the same width L1 to that of FIG. 8 can be also realized by appropriately designing the protection barrier.

In each embodiment, as described above, the shape of the second inner surface of the protection barrier is determined in a manner that an angle β formed between primary reflection light 93m and the line 90a in a planar view thereof is smaller than θ/2, and primary reflection light 93 of whole laser light 91 within the deflection angle θ including laser light 91m is applied onto the first inner surface of the protection barrier.

As long as the aforementioned predetermined conditions are satisfied, the shape of the second inner surface of the protection barrier may be a shape including inclined planes as illustrated in FIG. 6, or a shape including a curved surface as illustrated in FIG. 8. Alternatively, an inclined plane and an arc-shaped plane are present together, or a more complicated shape may be adapted.

The shape of the second inner surface of the protection barrier may be a shape partially including a region parallel to the first inner surface of the protection barrier. Particularly, primary reflection light 93 applied along around the center line 90 is unlikely to be leaked from the protection barrier to the outside. Therefore, the shape of the area of the second inner surface of the protection barrier adjacent to the center line 90 may be made parallel to the first inner surface of the protection barrier, and the surrounding areas may be inclined planes or an arc-shaped planes Third Embodiment The third embodiment is an example where the protection barrier is corresponded to a plurality of the laser devices. Note that, in the third embodiment, descriptions of the identical components or constitutional units to the aforementioned embodiments may be omitted.

FIG. 9 is a perspective view illustrating an example of the laser irradiation system according to the third embodiment. With reference to FIG. 9, the laser irradiation system 2 contains a plurality of laser devices 11, and a protection barrier 61 is configured to surround light paths of laser light emitted and scanned from each laser device 11 towards a rewritable label 600 at a deflection angle θ, and surround the container 500. Note that, two laser devices 11 are illustrated in FIG. 9, but the number of the laser devices 11 may be three or more.

FIG. 10 is a view for illustrating the protection barrier according to the third embodiment, and illustrates a state where the laser irradiation system 2 is not operated regularly. As illustrated in FIG. 10, the sides of the second inner surface 61b of the protection barrier 61 close to the openings (both ends relative to the transporting direction of the container 500) are inclined planes as in FIG. 6.

Specifically, an angle formed between primary reflection light of laser light emitted from the laser device 11 (left in FIG. 10) disposed at the position closest to the transporting inlet for the container 500 on the second inner surface 61b at the maximum deflation angle at the side of the transporting inlet, and a line parallel to the center line of the deflection angle θ is smaller than θ/2, in a planar view thereof (see FIG. 6).

Moreover, an angle formed between primary reflection light of laser light emitted from the laser device 11 (right in FIG. 10) disposed at the position closest to the transporting outlet for the container 500 on the second inner surface 61b at the maximum deflation angle at the side of the transporting outlet, and a line parallel to the center line of the deflection angle θ is smaller than θ/2, in a planar view thereof (see FIG. 6).

Moreover, primary reflection light which is whole laser light within the deflection angle θ reflected by the second inner surface 61b is applied onto the first inner surface 61a. As a result, the same effects to those of the first embodiment are exhibited.

Note that, the area of the second inner surface 61b of the protection barrier 61 close to the center is a plane parallel to the first inner surface 61a. In this manner, the protection barrier 61 can be designed to have a structure where the area of the second inner surface 61b other than the areas closed to the outlets can be made parallel to the transporting direction of the conveyor 31, and therefore there is less restriction in a shape of the protection barrier. Accordingly, the protection barrier 61 can be made small.

The areas of the second inner surface 61b of the protection barrier 61 close to the openings (both sides relative to the transporting direction of the container 500) may be an arc-shaped plane as in FIG. 8. Moreover, the entire second inner surface 61b of the protection barrier 61 may be composed of two inclined planes as in FIG. 6, or may be composed of one arc-shaped plane, as in FIG. 8.

Moreover, all of the laser devices 11 may not have the identical functions. For example, laser devices for printing and laser devices for erasing may be present together. In this case, a rewritable laser irradiation system can be realized.

Fourth Embodiment

The fourth embodiment is an example where the protection barrier is equipped with a movable member. Note that, in the fourth embodiment, descriptions of the identical components or constitutional units to the aforementioned embodiments may be omitted.

FIG. 11 is a diagram for illustrating the protection barrier according to the fourth embodiment. With reference to FIG. 11, the protection barrier 71 contains a first inner surface 71a, and a second inner surface 72b. For example, the first inner surface 71a side of the protection barrier is composed of a planar member, and is not equipped with a movable member.

Meanwhile, the second inner surface 72b side of the protection barrier is composed of a first member 711, a second member 712, and a third member 713. The first member 711 and the second member 712 are coupled with a hinge 718, and the first member 711 and the third member 713 are coupled with a hinge 719. In the present example, the second inner surface 72b side of the protection barrier is composed of three members, but the number of the members is not limited to three, as long as the second inner surface 72b side of the protection barrier is composed of at least two or more members.

The first inner surface 71a side of the protection barrier, and the first member 711 at the second inner surface 72b side are integrated composed with fastening with a screw, or welding. The second member 712 and the third member 713 are each movable relative to the first member 711 in the directions indicated with the arrows, and an angle thereof with the first member 711 can be changed. Each of the second member 712 and the third member 713 can be secured by the predetermined securing member, to have a certain angle with the first member 711 within the movable range.

As described above, the second inner surface side of the protection barrier is composed of two or more members, and one of the members is movable to the other members. As a result, the angle formed between primary reflection light of laser light applied onto one member and the line parallel to the center line of the deflection angle θ can be changed without changing the relative position between the other members and the deflection angle θ. Therefore, the protection barrier can be easily applied for various laser irradiation systems.

Fifth Embodiment

The fifth embodiment is an example where at least part of a plane of the protection barrier is inclined as viewed from the side. Note that, in the fifth embodiment, descriptions of the identical components or constitutional units to the aforementioned embodiments may be omitted.

FIG. 15 is a side view illustrating an example where a container 500 is present on a conveyor 31. FIG. 16 is a side view illustrating an example where a container is not present on a conveyor 31. FIGS. 17A through 17C are views of the protection barriers 21 from 3 directions. FIG. 18 is a perspective view of the protection barrier 21.

In FIGS. 15 and 16, 11 is a laser device, 91m is laser, and 93m is primary reflection light.

Sixth Embodiment

The sixth embodiment is an example where at least part of planes of the protection barrier is inclined as viewed in a plan view as well as a side view. Note that, in the sixth embodiment, descriptions of the identical components or constitutional units to the aforementioned embodiments may be omitted.

FIGS. 19A through 19C are views of the protection barrier 21 from 3 directions. FIG. 20 is a perspective view of the protection barrier 21. Regarding FIGS. 15 and 16, the sixth embodiment is the same as the fifth embodiment.

Seventh Embodiment

The seventh embodiment is an example where at least part of planes of the protection barrier is curved as viewed in a plan view as well as a side view. Note that, in the seventh embodiment, descriptions of the identical components or constitutional units to the aforementioned embodiments may be omitted.

FIGS. 21A through 21C are views of the protection barrier 21 from 3 directions. FIG. 22 is a perspective view of the protection barrier 21. Regarding FIGS. 15 and 16, the seventh embodiment is the same as the fifth embodiment.

The preferred embodiments are specifically described above, but the present invention is not limited to the embodiments described above. Various modifications and substitutions can be made to the aforementioned embodiments without being departed from the scopes specified by the claims of the present invention.

For example, the examples where the laser device 11 is an eraser are described in the aforementioned embodiments, but the laser device 11 may be a marker capable of printing on the rewritable label 600.

In FIGS. 6, 8 and 10, the width at the side of the first inner surface of the protection barrier is identical to the width at the side of the second inner surface (both L1), but the width of the protection barrier at the side of the first inner surface may be different from the width thereof at the side of the second inner surface, as long as the protection barrier satisfies the aforementioned predetermined conditions.

In order to improve the mechanical strength, moreover, the both ends of the first inner surface of the protection barrier relative to the transporting direction may be curved into the side of the conveyor in a planar view thereof. Similarly, the both ends of the second inner surface of the protection barrier relative to the transporting direction may be curved into the side of the conveyor in a planar view thereof.

As illustrated in FIG. 13, moreover, the both ends of the first inner surface of the protection barrier relative to the transporting direction may not be curved into the side of the conveyor in a planar view thereof. Similarly, the both ends of the second inner surface of the protection barrier relative to the transporting direction may not be curved into the side of the conveyor in a planar view thereof.

Although the shape of the protection barrier is illustrated in a planar view thereof in the examples, but the shape of the protection barrier as viewed from the side is similarly applied as the case viewing planary. Moreover, the shape of the protection barrier is not limited to the flat surface, or an arc-shaped curve as listed as examples, and the shape thereof may be a paraboloid of revolution, or a combination of the aforementioned shapes.

Moreover, the protection barrier is arranged in a shape, and an angle with which primary reflection light 93m is not applied onto the mirror 111 of the laser device 11. Furthermore, the protection barrier is arranged in a shape, and an angle with which a tertiary reflection light that is reflection light of secondary reflection light 95m, similarly 5-order reflection light, and further (n+1)-order (n is an integer of 0 or greater) reflection light are not applied onto the mirror 111 of the laser device 11. This is for the purpose of preventing the mirror, or lens (not illustrated) inside the laser device 11 from being damaged by irradiating these parts to reflection light.

Moreover, the irradiation target may be manually arranged adjacent to a laser irradiation outlet of the laser device, or manually arranged to the position separated from the laser radiation aperture of the laser device, other than the aforementioned case where the irradiation target is automatically transported by the conveyor.

For example, the embodiments of the present invention are as follows.

<1> A protection barrier including:

openings through which an irradiation target passes through the protection barrier, wherein the protection barrier is configured to surround a light path of laser light emitted from a laser device towards a recording medium disposed on the irradiation target, and surround the irradiation target, and wherein a light intensity of the laser light leaked from the openings is 390 μW or less.

<2> A protection barrier including:

a curve projecting towards an outer side of the protection barrier, where the curve is disposed at a surface of the protection barrier opposed to a radiation aperture of a laser device, wherein the protection barrier is used in a laser irradiation system containing the laser device configured to irradiate a recording medium disposed on an irradiation target, with laser light, and the protection barrier is configured to surround a light path of laser light scanned at a deflection angle θ towards the recording medium, and surround the irradiation target.

<3> The protection barrier according to <1> or <2>, wherein a plurality of the laser devices are disposed, and the protection barrier is configured to surround a light path of laser light scanned at a deflection angle θ towards the recording medium from each of the laser devices, wherein the protection barrier includes a first inner side surface at a side of the laser device, and a second inner side surface facing the first inner side surface, wherein, when the irradiation target is not present at a position where laser light emitted from each laser device is scanned, an angle between primary reflection light and a line parallel to a center line of the deflection angle is smaller than θ/2 in a planar view thereof, where the primary reflection light is primary reflection light of the laser light applied onto the second inner surface from the laser device disposed at a position closest to a transporting inlet for the irradiation target at a maximum deflection angle at a side of the transporting inlet, an angle between primary reflection light and the line parallel to the center line of the deflection angle θ is smaller than θ/2, where the primary reflection light is primary reflection light of the laser light applied onto the second inner surface from the laser device disposed at a position closest to a transporting outlet for the irradiation target at a maximum deflection angle at a side of the transporting outlet, and primary reflection light that is whole laser light applied within the deflection angle θ and reflected by the second inner surface is applied onto a first inner surface.

<4> The protection barrier according to <3>, wherein an angle between the primary reflection light and the line parallel to the center line of the deflection angle θ in a planar view thereof is smaller than θ/2 when the irradiation target is not present at a position where laser light is scanned, where the primary reflection light is primary reflection light of the whole laser light applied within the deflection angle θ onto the second inner surface.

<5> The protection barrier according to <3> or <4>, wherein the second inner surface includes an arc-shaped curved plane that is recessed relative to a direction of the laser device.

<6> The protection barrier according to any one of <3> to <5>, wherein the second inner surface side of the protection barrier is composed of two or more members, where one member is movable relative to the other members, and wherein an angle formed between primary reflection light of laser light applied onto the one member and a line parallel to a center line of the deflection angle θ can be changed without changing a relative position between the other members and the deflection angle θ.

<7> The protection barrier according to any one of <1> to <6>, wherein the laser device is a laser device used in a laser irradiation system, which is configured to record and erase information on the recording medium repeatedly.

<8> A laser irradiation system including:
a transporting device configured to transport an irradiation target;
a laser device configured to irradiate a recording medium with laser light;
a controlling device configured to control the laser device and the transporting device; and
the protection barrier according to any one of <1> to <7>.

REFERENCE SIGNS LIST 1, 2 laser irradiation system
11 laser device
21, 51, 61, 71 protection barrier
21a, 51a, 61a, 71a first inner surface
21b, 51b, 61b, 71b second inner surface
31 conveyor
41 controlling device
111 galvanometer mirror
112 galvano driver
113 laser diode array
114 laser driver
115 lens
116 terminal box
117 control panel
118 controller
300 power sensor
301 display
500 container
600 rewritable label
711 first member
712 second member
713 third member
718, 719 hinge
1111 galvanometer
1112 mirror
1151 cylindrical lens
1152 spherical lens
1153 microlens array
1154 spherical lens
1155 cylindrical lens
1181 galvano controlling unit
1182 laser controlling unit
1183 erasing condition setting unit
1184 erasing operation controlling unit

The invention claimed is:

1. A protection barrier comprising:
openings through which an irradiation target passes through the protection barrier,
wherein the protection barrier is configured to surround a light path of laser light emitted from a laser device towards a recording medium disposed on the irradiation target, and surround the irradiation target, and
wherein a light intensity of the laser light leaked from the openings is 390 μW or less.

2. The protection barrier according to claim 1, wherein when a plurality of the laser devices are disposed, the protection barrier is configured to surround a light path of the laser light scanned at the deflection angle θ towards the recording medium from each of the laser devices,
the protection barrier comprises a first inner side surface at a side of the laser device, and a second inner side surface facing the first inner side surface,
when the irradiation target is not present at a position where laser light emitted from each laser device is scanned, an angle between primary reflection light and a line parallel to a center line of the deflection angle is smaller than θ/2 in a planar view thereof, where the primary reflection light is primary reflection light of the laser light applied onto the second inner surface from the laser device disposed at a position closest to a transporting inlet for the irradiation target at a maximum deflection angle at a side of the transporting inlet,
an angle between primary reflection light and the line parallel to the center line of the deflection angle θ is smaller than θ/2, where the primary reflection light is primary reflection light of the laser light applied onto the second inner surface from the laser device disposed at a position closest to a transporting outlet for the irradiation target at a maximum deflection angle at a side of the transporting outlet, and
the primary reflection light that is whole laser light applied within the deflection angle θ and reflected by the second inner surface is applied onto a first inner surface.

3. The protection barrier according to claim 2, wherein an angle between the primary reflection light and the line parallel to the center line of the deflection angle θ in a planar view thereof is smaller than θ/2 when the irradiation target is not present at a position where laser light is scanned, and
the primary reflection light is primary reflection light of the whole laser light applied within the deflection angle θ onto the second inner surface.

4. The protection barrier according to claim 2, wherein the second inner surface includes an arc-shaped curved plane that is recessed relative to a direction of the laser device.

5. The protection barrier according to claim 2, wherein the second inner surface side of the protection barrier is composed of two or more members, where one member is movable relative to the other members, and
wherein an angle formed between primary reflection light of laser light applied onto the one member and a line parallel to a center line of the deflection angle θ can be changed without changing a relative position between the other members and the deflection angle θ.

6. The protection barrier according to claim 1, wherein the laser device is a laser device used in a laser irradiation system, which is configured to record and erase information on the recording medium repeatedly.

7. A protection barrier comprising:
a curved portion projecting outward in a first direction towards an outer side of the protection barrier, wherein the curved portion is disposed at a first surface of the protection barrier opposed to a radiation aperture of a laser device, the first direction extending from the radiation aperture towards the first surface,
wherein the protection barrier is part of a laser irradiation system containing the laser device, which is configured to irradiate a recording medium disposed on an irradiation target with the laser light, and
the protection barrier is configured to surround a light path of the laser light, which is scanned at a deflection angle θ towards the recording medium, and surround the irradiation target.

8. A laser irradiation system comprising:
a transporting device configured to transport an irradiation target;
a laser device configured to irradiate a recording medium with laser light;
a controlling device configured to control the laser device and the transporting device; and
a protection barrier including openings through which an irradiation target passes through the protection barrier, wherein the protection barrier is configured to surround a light path of laser light emitted from a laser device towards a recording medium disposed on the irradiation target, and surround the irradiation target, and wherein a light intensity of the laser light leaked from the openings is 390 µW or less.

\* \* \* \* \*